Oct. 19, 1965  J. A. ROBERTS  3,212,652

STORAGE APPARATUS

Filed April 9, 1963

United States Patent Office 3,212,652
Patented Oct. 19, 1965

3,212,652
STORAGE APPARATUS
John A. Roberts, 2554 Lindenwood Drive,
Bridgeville, Pa.
Filed Apr. 9, 1963, Ser. No. 271,712
2 Claims. (Cl. 214—17)

This invention relates to improved apparatus for the storing and handling of particulate or granular materials and relates particularly to a new storage facility.

In the handling of bulk particulate or aggregate materials such as chemical fertilizers, grain and semi-processed minerals, it is frequently desirable to employ square or box-shaped storage bins or tanks. Belt conveyors and other type conveyor apparatus easily and efficiently fill such storage bins by transporting such materials through an opening at the top. However, the unloading of such storage facilities is not a simple matter. Storage tanks and bins are difficult to empty from an opening in the bottom, particularly when the bin contains a substantial quantity of the particulate or granular material being stored, because the material at the bottom of the tank is highly compacted which prevents the material from flowing freely. Attempts to overcome this difficulty by constructing the bottom of such storage bins in a funnel fashion have been relatively unsuccessful, particularly when used for the storage of material susceptible to compacting under pressure. Also, such a facility constitutes a waste in space since the funnel portion of such a tank or bin cannot hold the equivalent of a full sized storage tank or bin.

Attempts to mechanically remove such materials from the bottom of such bins or tanks have also been relatively unsuccessful since it is necessary to remove such material uniformly from the entire bottom area to avoid compacting of the particulate or granular material in a manner to prevent further removal. Warm-type conveyors projecting into the bottom of such a storage tank are unsatisfactory since the compacting material forms a tunnel around the conveyor. Even if the conveyor is constructed to move back and forth in a windshield wiper fashion it will not effectively remove materials from such storage facilities. Prior to the present invention, the only really successful method of removing such materials from storage tanks or bins was to empty them by means of portable conveyors from the top of the stored material. Such methods are awkward and expensive since they require manual handling and must be transported in and out of the storage facility.

Applicant's copending patent application Ser. No. 209,417, filed July 12, 1962, now Patent No. 3,127,032, provides a novel and effective apparatus that removes stored materials from the bottom of cylindrical or silo-type storage facilities, but such means are not adaptable to cubical or box-shaped storage bins or tanks.

The storage apparatus of the present invention provides a cubical or box-shaped tank or bin for the storage of particulate or granular material that may be emptied from the bottom easily and efficiently regardless of the compacting nature of the materials being stored and which makes efficient use of storage space.

Accordingly, it is the object of the present invention to provide a storage facility for storing particulate or granular material that may be unloaded from the bottom.

It is also the object of the present invention to provide a means for unloading cubical or box-shaped storage facilities from the bottom that will completely remove all of the material and will not be affected by the compacting nature of the material.

It is a still further object of the present invention to provide a substantially box-shaped storage facility that will efficiently store particulate or granular material that is susceptible to compacting but which will provide means for unloading such material from the bottom of the facility.

Other objects and advantageous features of the present invention will be obvious from the following specification and drawings wherein.

Figure 1:
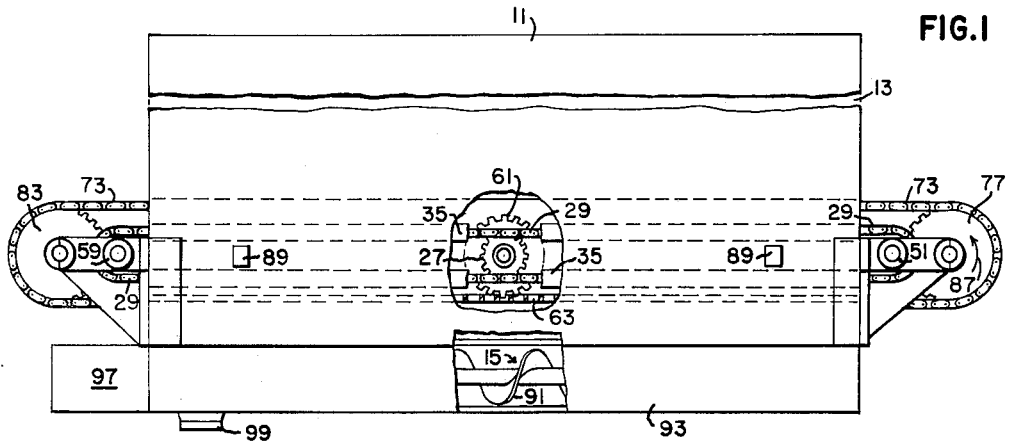
FIGURE 1 is a side elevation view, partially broken away, of a storage tank which constitutes one embodiment of the apparatus of the present invention.
Figure 2:
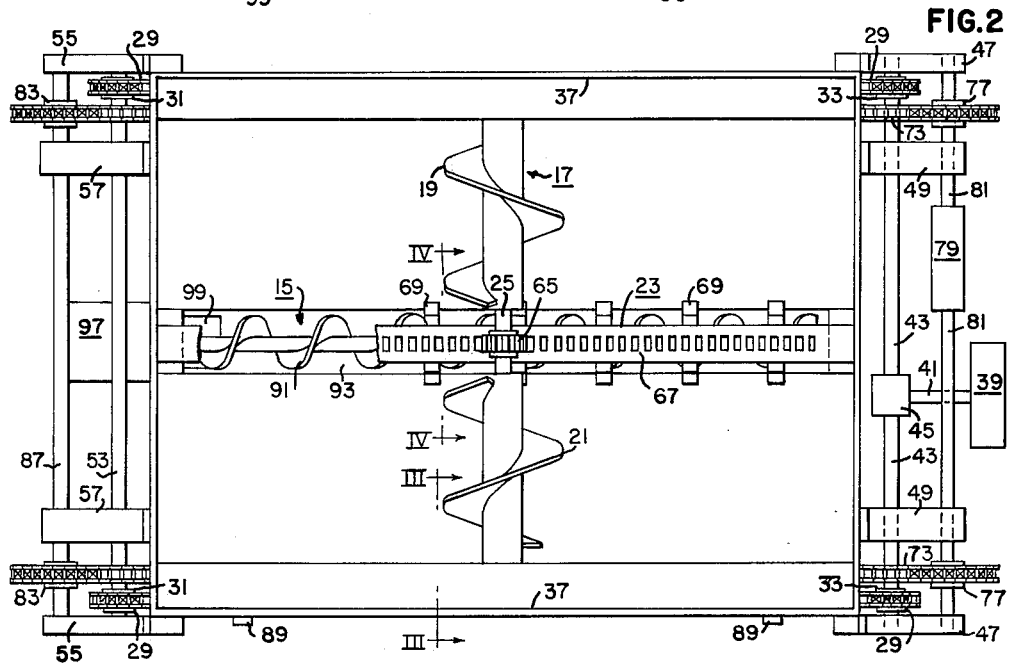
FIG. 2 is an elevation view from the top of the apparatus of FIG. 1.
Figures 3, 4:
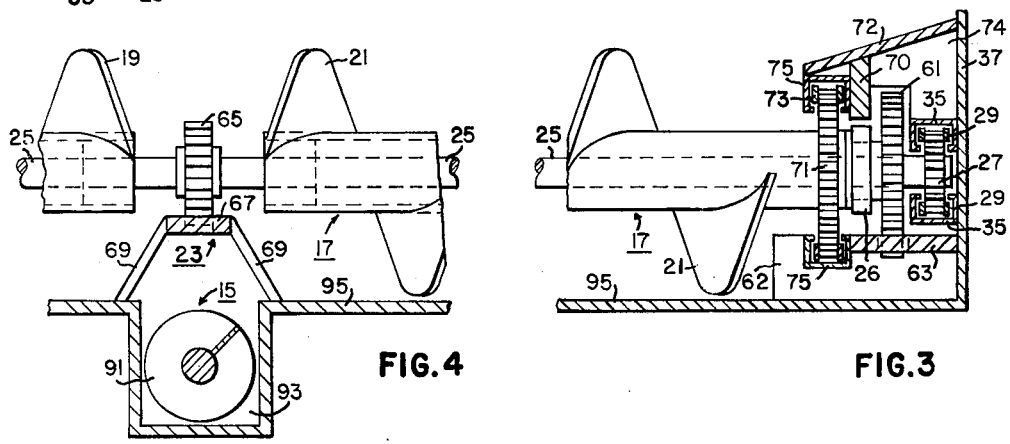
FIG. 3 is a sectional view, partially in cross section, taken along the line III—III of FIG. 2.
FIG. 4 is a sectional view, partially in cross section, taken along the line IV—IV of FIG. 2.

In the drawings there is shown a box-shaped storage tank 11 which constitutes one embodiment of the apparatus of the present invention. Storage tank 11 is shown to be broken away at 13 (see FIG. 1) to indicate that the tank will normally be much taller in scale than shown by FIG. 1. The apparatus, as shown by FIG. 2, is composed generally of two conveyor systems, identified in this description as a longitudinal conveyor system 15 and transverse conveyor system 17. Such terms as longitudinal and transverse as applied to the present invention are relative, since it is obvious that the tank 11, as shown in FIG. 2, may well be square (cube-shaped) instead of rectangular (box-shaped) so that there is no fixed longitudinal or transverse direction relative to the tank; also, the conveyor systems 15 and 17 may be reversed while remaining within the scope of this description. The conveyor system 17 is composed of two opposingly pitched worm conveyors 19 and 21 disposed on either side of a central track 23. Worm conveyors 19 and 21 are rotatably mounted on a central shaft 25 (FIGS. 3 and 4) by means of bearing surfaces (not shown) between the worm conveyors 19 and 21 and the central shaft 25 (FIGS. 3 and 4). The central shaft 25 extends across the width of tank 11 and is provided with sprocket wheels 27 (only one of which is shown) rigidly attached to either end of the shaft 25. Sprocket wheels 27 are driven or caused to rotate by drive chains 29 which extend through the tank 11 to the outside of the tank through openings (not shown) and are driven by and supported by the sprockets 31 and 33 (FIG. 2). As shown particularly by FIGS. 1 and 3, the drive chains 29 mesh with the teeth of the sprockets 27, 31 and 33 so that upon rotation of the sprockets 31 and 33 the sprockets 27 and hence the shaft 25 are caused to rotate. The chains 29 are partially shielded or encased by guard channels 35 which project through the tank 11 and are attached to the outer walls 37 of the tank 11. The channels 35 guide drive chains 29 so that they continue to mesh with sprockets 27 and also protect the chains 29 from becoming clogged with the particulate material stored in the tank 11. The chains 29 are driven by means of a motor and gearing apparatus illustrated generally at 39 (FIG. 2) which drive the shaft 41 which in turn drives the shafts 43 through the torque clutch depicted at 45 to drive the sprockets 33. The shafts 43 are shown to be supported by support brackets 47 and 49 that are rigidly attached to the tank 11. The shafts 43 are rotatably mounted with the supporting members 47 and 49 by means of bearing surfaces such as shown at 51 (FIG. 1). Sprockets 31 on the opposite side of the tank 11 are shown to be rigidly attached to an idler shaft 53 that is rotatably mounted on supporting members 55 and 57. The shaft 53 is rotatably mounted in the supporting members 55 and 57 by means of bearing surfaces such as shown at 59. Hence, it may be seen that upon actuation of motor and gearing apparatus 39 shafts 41 and 43 are caused to rotate causing sprockets 33 and 31 to rotate and drive sprockets 27 and shaft 25 by means of the drive chains 29. The function of the torque clutch 45 will be shown herebelow.

A second set of drive sprockets 61 are rigidly attached to the shaft 25 inwardly from the sprockets 27. Sprockets 61 are disposed to mesh with perforated tracks 63 which in the present embodiment extend the longitudinal distance of the tank 11 near each outer wall 37 and near the bottom of the tank 11. It may be seen that when sprockets 27 are caused to rotate the sprockets 61 rotate on the tracks 63 and cause the shaft 25 to move along the bottom of the tank 11 in a direction dictated by the torque direction of shafts 41 and 43.

As additional support for the shaft 25 there is shown an additional sprocket 65 centrally disposed about the shaft 25 and an additional perforated track 67 centrally positioned between the tracks 63. Track 67 is supported by periodically positioned supporting members 69. Sprocket wheel 65 cooperates with the track 67 upon rotation of shaft 25 to effect a more rigid drive and support for conveyor system 17. The additional sprocket 65 and track 67 are optional and their need is determined by the size of the tank and the compacting nature of the material being stored.

Worm conveyors 19 and 21, as hereabove stated, are rotatably mounted on the shaft 25. There is rigidly attached to each of the worm conveyors at their outermost ends a rigidly attached sprocket wheel 71 (see FIG. 3). Sprocket wheels 71 are engaged by and driven by drive chains 73 in a similar manner by which sprocket wheels 27 are driven by chains 29. Guard channels 75 perform a similar function in protecting drive chain 73 from the stored particulate material and in assuring meshing contact of the chains 73 with the sprockets as guard channels 35 perform in respect to drive chains 29 and sprockets 27. The chains 73 are driven by drive sprockets 77 which are in turn driven by a motor and gearing system 79 (FIG. 2) through shaft 81. Shaft 81 is rotatably mounted in the support members 47 and 49. Idler sprockets 83 are mounted on a shaft 87 that is rotatably mounted on the other end of the tank 11 in support members 55 and 57 and support the chain 73. Chain 73 projects through openings (not shown) in the side of the tank 11.

It may be seen that actuation of the motor and gearing apparatus 79 drives the sprockets 77 which in turn drive the sprockets 71 which drive the worm conveyors 19 and 21 of the conveyor system 17. It is to be noted that this drive is constant and in one direction (arrow 87 of FIG. 1) so as to rotate the conveyors 19 and 21 in a manner to transport particulate material to the center of the tank 11.

The rotation of the shafts 41 and 43 and hence the drive chains 29 is reversed whenever the shafts 25 contact microswitches 89 on either end of the tank 11. Such apparatus to effect such reverse drive is well known and obvious to one skilled in the mechanical arts and will not be explained in detail here. It may be seen that the chain 29 will be drive so that the conveyor system 17 will sweep the length of the bottom of the tank 11 back and forth while the chain 71 drives conveyors 19 and 21 to transport the particulate material to the center of the tank.

The torque clutch 45 is set to effect a predetermined torque drive on shafts 43 if such drive force is exceeded, or if too great a load is put on the shafts 43 by resistance of compacted stored particulate material to conveyor 17 the torque clutch permits the shafts 41 to idle while conveyors 19 and 21 clear a path for further travel of the conveyor system 17. Details of the torque clutch 45 are not shown as such clutches are well known and the exact type employed is optional in the present embodiment. Examples of suitable torque clutches may be found in United States Patents 2,582,077, 2,593,521, 2,969,132 and 2,969,133.

Conveyor system 15 in the present embodiment consists of a centrally disposed worm conveyor 91 that extends the entire length of tank 11. Worm conveyor 91 is positioned within a centrally located channel 93 formed in the bottom 95 of the tank 11 below centrally located track 67. Worm conveyor 91 is driven by a conventional motor and gearing apparatus, illustrated at 97, in a counterclockwise direction (when viewed from the apparatus 97) to transport particulate material deposited by the conveyor system 17 or worm conveyors 19 and 21 to the central channel 93 and thence to an opening 99 formed in the bottom of tank 11. It may be seen that the conveyor 91 need turn consistently only in one direction and that since the worm conveyor 91 extends the length of the channel 93 and the tank 11 it makes no difference in what position the conveyor system 17 is while sweeping the bottom of tank 11.

It should be noted that the sprocket wheels 27, 61 and 71, associated channels 29 and 73 and perforated track 63 are protected from the particulate material by a guard plate 72 attached to the inside of the outer wall 37 of tank 11 and by periodic supporting plates 74 attached to wall 37. Also, it should be noted that track 63 is supported by periodic plates 62 attached to bottom 95 and side wall 37 of the tank 11.

Positioned about the shaft 25 there is found a freely rotatable member 26 supported on the shaft 25 by bearing surfaces (not shown) and independently rotatable in respect to worm conveyor 21 and shaft 25. Attached to guard plate 72 and extending downwardly is a bumper bar 70. Hence, if particulate material gets within the perforations of the track 63 and the sprocket wheel 61 tends to rise or disengage the track, the rotatable member 26 will bear on the bumper bar 70 and sprocket wheel 61 will be held in place.

Many obvious modifications of the present invention may be readily observed. The conveyor system 15 need not be composed of a worm type conveyor such as conveyor 91 but could be a belt or other type conveyor. A third drive chain system such as chain 29 may be centrally positioned in conjunction with sprocket 65 and track 69 if the size of the tank is so large as to require such a third driving system. The channel 93 may be trough shaped or the bottom 95 of the tank may slope to the center (in which case a universal joint in the center of shaft 25 may be necessary or two independent shafts 25 could be employed).

It is to be understood that the apparatus of the present invention may be constructed of any suitable material but will generally be constructed of steel, and the various components, such as guard plate 72, will ordinarily be attached to the outer walls 37 of the tank 11 as by welding.

The apparatus of the present invention may be employed to remove any particulate material from a cubical or box-shaped tank including such materials as petroleum sludge and similar semi-liquid materials, particularly those that are susceptible to compacting. For purposes of the present claims, the terms "particulate" and "granular" shall include soft or hard materials including such substances as sludges and silage.

I claim:
1. A storage apparatus for storing compactable material comprising:
   (a) a substantially rectangular box-shaped container;
   (b) a first conveyor means rigidly positioned along the bottom of said container substantially parallel to two opposing sides of said container, said first conveyor means being disposed to convey said material in a path substantially parallel to said two opposing sides;
   (c) said container being formed with at least one opening near the bottom thereof adjacent said first conveyor means so as to eject material conveyed by said first conveyor means;
   (d) at least two spaced perforated rails extending along the bottom of said container substantially parallel to said two opposing sides of said container;

(e) a drive shaft positioned at the bottom of said container transverse said first conveyor means and terminating at each end substantially adjacent to said two opposing sides of said container;

(f) at least two rail meshing sprockets rigidly attached to said drive shaft, one each of said sprockets being disposed to cooperate with each said perforated rails so as to cause said drive shaft to rotate and uniformly sweep across the bottom of said container when said sprockets are caused to rotate on said perforated rail;

(g) worm conveyors positioned about said drive shaft, one one either side of said first conveyor means, and disposed to rotate thereon independently of rotation of said drive shaft and being further disposed to convey said material to said first conveyor means;

(h) means for effecting rotation of said sprockets so as to cause said drive shaft to sweep the bottom of said container between said two opposing sides, and (i) means for effecting independent rotation of said worm conveyors so as to convey material to said first conveyor means.

2. A storage apparatus for storing compactable material comprising:

(a) a substantially box-shaped container;

(b) a first conveyor means rigidly positioned along the bottom of said container substantially parallel to two opposing sides of said container, said first conveyor means being disposed to convey said material in a path substantially parallel to said two opposing sides;

(c) said container being formed with at least one opening near the bottom thereof adjacent said first conveyor means so as to eject material conveyed by said first conveyor means;

(d) at least two spaced perforated rails extending along the bottom of said container substantially parallel to said two opposing sides of said container;

(e) a drive shaft positioned at the bottom of said container traversing said first conveyor means and terminating at each end substantially adjacent to said two opposing sides of said container;

(f) at least two rail meshing sprockets rigidly attached to said drive shaft, one each said sprockets being disposed to cooperate with each said perforated rails so as to cause said drive shaft to rotate and uniformly sweep across the bottom of said container when said sprockets are caused to rotate on said perforated rails;

(g) worm conveyors positioned about said drive shaft, one on either side of said first conveyor means, and disposed to rotate thereon independently of rotation of said drive shaft and being further disposed to convey said material to said first conveyor means;

(h) at least one drive chain positioned over opposing sprockets rigidly mounted exterior to said container and projecting through openings formed in said container extending horizontally through said container substantially parallel to said two opposing sides and projecting on either side of said drive shaft;

(i) at least one drive sprocket rigidly attached to said drive shaft and one each of said drive sprockets being disposed to cooperate with said drive chain so that upon rotation of said opposing sprockets said drive chain will cause said drive sprockets to rotate to effect rotation of said drive shaft and said rail meshing sprockets in said perforated rails and cause said drive shaft to sweep the bottom of said container between said opposing sides;

(j) at least two drive chains, positioned over opposing sprockets rigidly mounted exterior to said container and projecting through openings formed in said container extending horizontally through said container substantially parallel to said two opposing sides;

(k) at least one drive sprocket rigidly attached to each said worm conveyors and one each of the drive chains of paragraph (j) above being disposed to cooperate with and drive each said drive sprockets rigidly attached to said worm conveyors so as to cause said worm conveyors to convey material to said first conveyors means;

(l) means for effecting rotation of the drive sprockets of paragraph (h) above, and (m) means for effecting rotation of the drive sprockets of paragraph (j) above.

References Cited by the Examiner

UNITED STATES PATENTS

| | | | |
|---|---|---|---|
| 733,988 | 7/03 | Mittag | 198—96 X |
| 3,063,581 | 11/62 | Bruecker | 214—17.84 |
| 3,077,995 | 2/63 | Booth et al. | 214—17.82 |

FOREIGN PATENTS

| | | |
|---|---|---|
| 86,597 | 6/36 | Sweden. |

HUGO O. SCHULZ, *Primary Examiner.*